April 21, 1959

R. N. JUNGLES 2,883,017

BRAKE MECHANISM

Filed Sept. 7, 1954

INVENTOR.
ROBERT N. JUNGLES
BY

ATTORNEY

April 21, 1959

R. N. JUNGLES 2,883,017

BRAKE MECHANISM

Filed Sept. 7, 1954

INVENTOR.
ROBERT N. JUNGLES
BY
ATTORNEY

April 21, 1959

R. N. JUNGLES 2,883,017

BRAKE MECHANISM

Filed Sept. 7, 1954

INVENTOR.
ROBERT N. JUNGLES
BY
ATTORNEY

united states patent office

2,883,017
Patented Apr. 21, 1959

2,883,017

BRAKE MECHANISM

Robert N. Jungles, Parma, Ohio, assignor to Cleveland Pneumatic Industries, Inc., Cleveland, Ohio, a corporation of Ohio Application September 7, 1954, Serial No. 454,389

2 Claims. (Cl. 192—8)

This invention relates to two-directional brake mechanisms in general and more particularly to a brake and an automatic control which applies the brake only when the driven element of a mechanism attempts to drive the driving element.

In mechanisms incorporating ball screws, difficulty has been encountered in locking the screw in the desired position so that it will not rotate in response to the load carried by the screw. This is because ball screws provide highly efficient conversion of forces.

It is an important object of this invention to provide a ball screw and nut mechanism with a two-directional clutch device automatically preventing the screw from rotating by virtue of the load carried by the nut.

It is another important object of this invention to provide a two-direction brake means and control for use in a mechanism providing a driving member and a driven member which brake and control automatically prevents the driven member from supplying power to the driving member.

It is still another object of this invention to provide a coupling for connecting a driving and a driven member which automatically prevents the driven member from supplying power to the driving member.

Further objects and advantages will appear from the following description and drawings, wherein.

Figure 1:
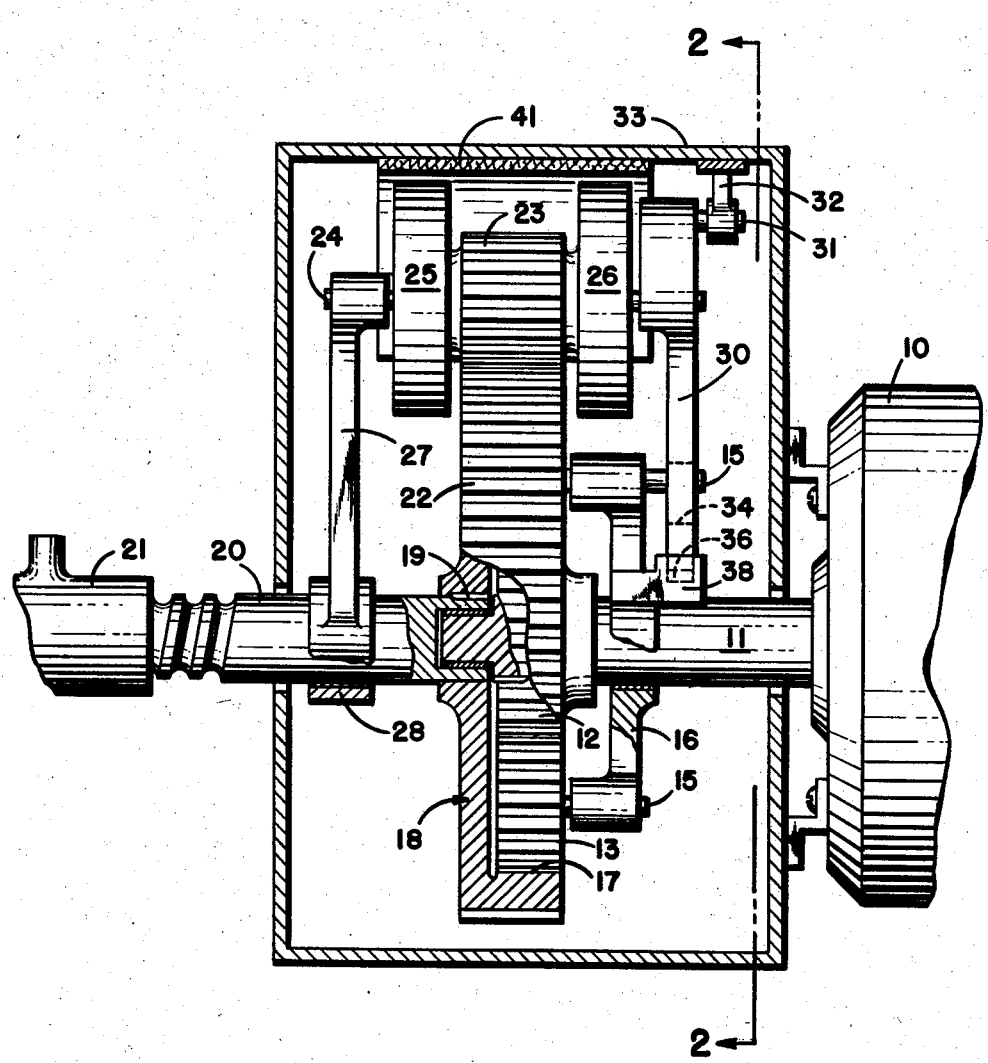
Figure 1 is a longitudinal view partly in section of a mechanism embodying the invention.

Referring to the drawings, 10 designates a power source such as an electric motor having a motor shaft, hereafter referred to as driving element 11, extending from one end thereof. Fixed on the free end of element 11 for rotation therewith, there is a sun gear 12 in mesh with intermediate gears 13 rotatable on stub arbors 15 carried by the free ends of a through arm 16, through the center portion of which extends the driving member 11 in supporting but non-driving relation therewith. The intermediate gears 13 are in mesh with the internal teeth 17 of a ring gear 18, the latter being fixed by any suitable means such as a key 19 to a driven element 20 herein represented by a ball screw having a nut or load carrying member 21 cooperating therewith for movement relative thereto.

The ring gear 18 has external teeth 22 in mesh with an external gear 23 which is fixed on a cross arbor 24 on which is also fixed on each side of gear 23 two friction disks or movable brake elements 25 and 26. Cross arbor 24 has one end journaled within the free end of an arm 27 which has its inner end 28 fitted over and supported by the driven member 20. The other end of cross arbor 24 is operatively supported within a lateral slot 29 of a second arm 30 having its upper end in Figure 2 pivotly supported by a pin 31 carried by a bracket 32 which in turn is fixed to the inner wall of any suitable housing such as 33. Near its inner end arm 30 is formed with a slot 34 extending lengthwise of the arm in which is fitted one end of a stub arbor 15 on which is rotatably mounted the gear 13. The inner end of arm 30 is formed with laterally extending flanges 36 and 37 engageable with laterally spaced stops 38 and 39 formed as an integral part of the through arm 16.

Fastened within the upper end portion of housing 33, there are two laterally spaced brake shoes 40 and 41 having accurate inner surfaces engageable by the friction disks 25 and 26.

Figure 2:
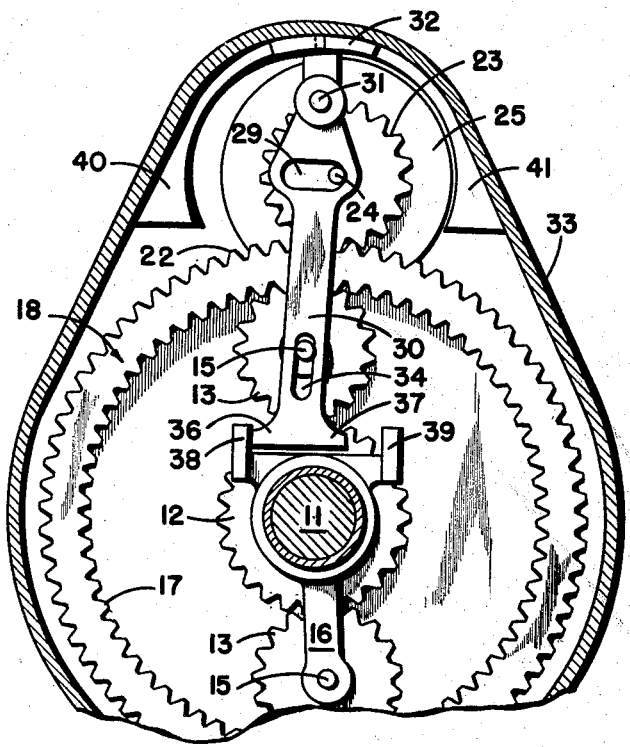
Figure 2 is a cross sectional view taken in line 2—2 in Figure 1 looking in the direction of the arrows.

The operation of the device is as follows:

Upon normal transmission of rotation from the driving element 11 to the driven element or screw 20, and assuming for the purpose of explanation that this rotation is in a counter-clockwise direction in Figure 2, it will be understood that rotation of sun gear 12 in that direction will impart rotation to intermediate gears 13 in the opposite direction and rotation of the ring gear 18 and screw 20 in a direction opposite to the sun gear 12. By virtue of rotation of sun gear 12 in a counter-clockwise direction, intermediate gear 13 will shift to the left in Figure 2 to cause engagement of the inner end 36 of arm 30 with stop 38. Similarly, rotation of the ring gear 18 will cause external gear 23 to shift to the right in Figure 2 until its carrying shaft 24 engages one end of the slot 29 thereby positioning the friction disks 25 and 26 close to but without contact with the brake shoe 41 and consequently enabling free normal rotation transmission from shaft 11 to driven member or screw 20.

Figure 3:
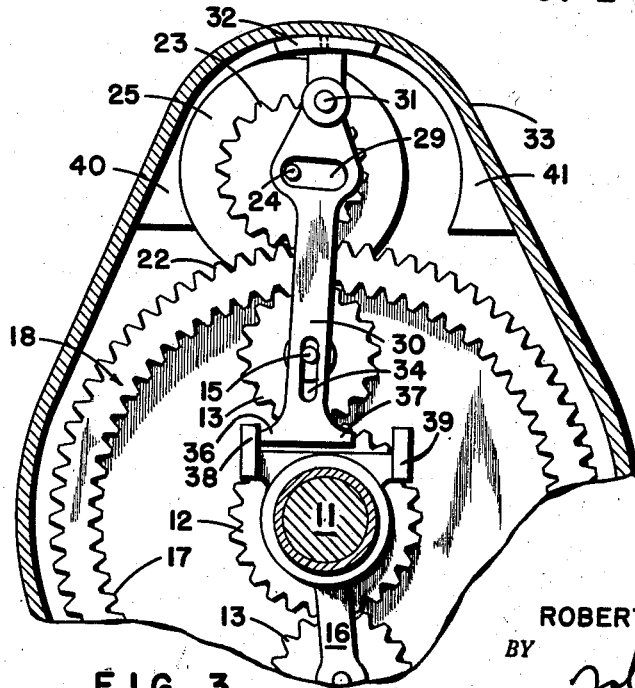
Figure 3 is a view similar to Figure 2 but showing some of the parts in different positions.
Figure 4:
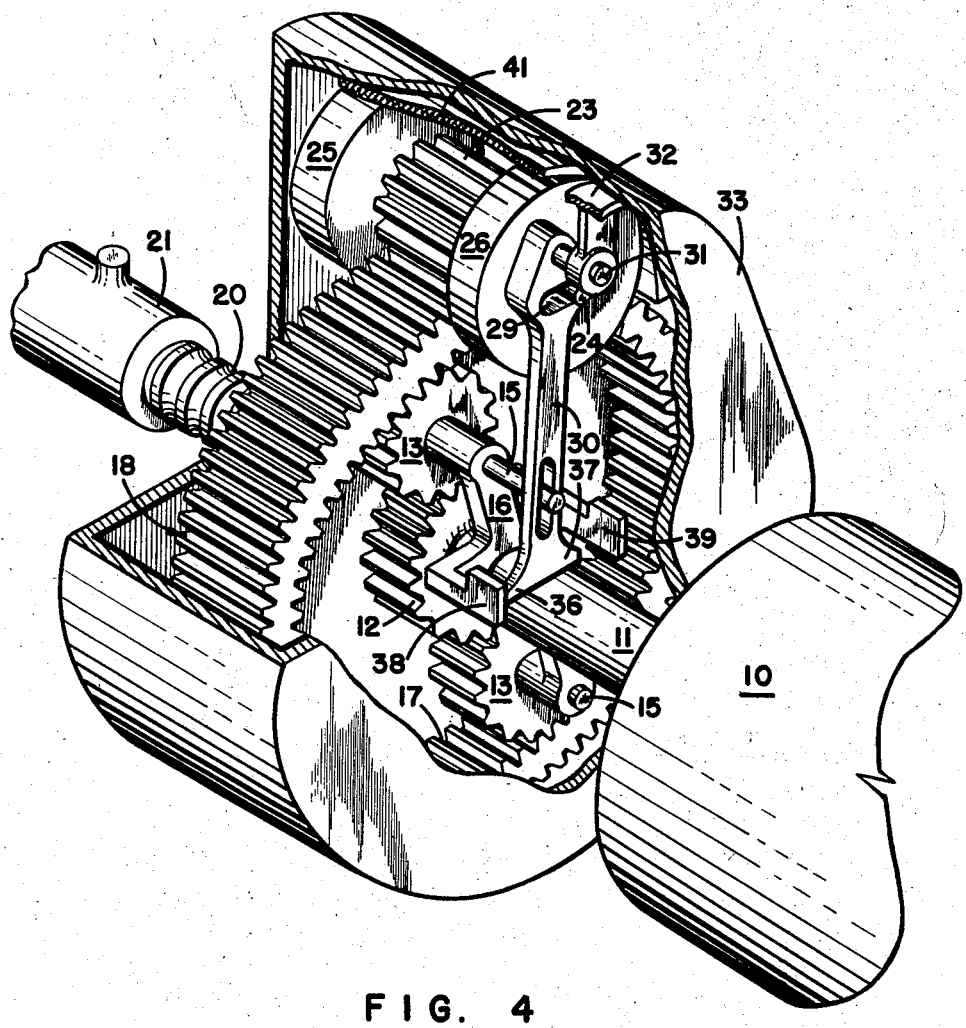
Figure 4 is a pictorial view shown with parts broken away from the device embodying the invention.

In some instances, when power is shut off from motor 10, the load carried by the nut 21 is sufficient to cause axial movement of the nut relative to the screw 20 and rotation of the latter in one or the other direction depending upon the direction of the load applied on the nut 21. Assuming that the load to which the nut 21 is subjected is sufficient to cause rotation of the screw 20 in a counter-clockwise direction in Figure 3, such rotation would be transmitted to the ring gear 18 and therefrom to external gear 23, causing the latter to shift to the left as shown in Figure 3. Because the arm 30 is still in its left hand position resulting from the normal rotation transmission between the two elements 11 and 20 as above described, the left hand of slot 29 cannot engage the shaft 24 prior to the engagement of the friction disks 25 and 26 with the brake shoe 40 thereby causing forcible engagement of the friction disks with the brake shoe to prevent further rotation of the pinion gear 23 and consequently further rotation of the ring gear 18 and driven member 20.

It will be understood that in the event the load applied to the nut 21 is in the direction tending to rotate the screw 20 in a clockwise direction in Figure 3, such rotation would cause pivotal motion of the arm 30 on the cross pin 31 until the arm flange 37 engages the stop 39. In this new position of the arm 30 the right hand of slot 29 would remain spaced from the shaft 24 to permit the resulting forcible engagement of the friction disks 25 and 26 with the brake shoe 41 to prevent further rotation of the pinion gear 23 and consequently of the ring gear 18 and screw 20 in that direction.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation.

I claim:

1. In a device of the character described a driving member, a driven member, driving means between said members providing for limited relative rotation therebetween, movable brake means including a single movable brake element geared to said driven member movable between two extreme positions in response to rotation of said driven member, stationary brake element engageable by said movable brake element upon movement thereof to either of said two extreme positions, operating means movable in response to said relative rotation preventing movement of said movable brake element to said extreme positions only when said driving member rotates said driven member.

2. In a device of the character described a rotatable driving member and coaxial driven member, a sun gear fixed to one of said members, a ring gear fixed to the other of said members, intermediate gears intermeshed with said sun and ring gears for transmitting rotation therebetween, support means movable in response to movement of said intermediate gears about the central axis of said members for limiting such movement thereof, an external gear intermeshed with said ring gear and connected to said support means for limited peripheral motion relative to said central axis, said intermediate gears being urged in one direction with respect to said central axis and said external gear being urged in the opposite direction with respect to said central axis when said driving member supplies power to said driven member and said intermediate gears and external gear being urged in the same direction with respect to said central axis when said driven member supplies power to said driving member, and brake means connected to said external gear proportioned to be engaged only when both said external gear and intermediate gears are urged in the same direction relative to said central axis.

References Cited in the file of this patent
UNITED STATES PATENTS

| | | |
|---|---|---|
| 1,279,272 | Coleman | Sept. 17, 1918 |
| 2,402,073 | Newell | June 11, 1946 |